US010850492B2

(12) United States Patent
Endres et al.

(10) Patent No.: US 10,850,492 B2
(45) Date of Patent: Dec. 1, 2020

(54) SECURITY THREAD FOR DATA CARRIERS, DATA CARRIERS, AND PRODUCTION OF SAID DATA CARRIERS

(75) Inventors: Günter Endres, München (DE); Jürgen Karl Stahl, München (DE); Lars Hoffmann, Freising (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 13/810,921

(22) PCT Filed: Jul. 20, 2011

(86) PCT No.: PCT/EP2011/003648
§ 371 (c)(1),
(2), (4) Date: Jan. 18, 2013

(87) PCT Pub. No.: WO2012/022413
PCT Pub. Date: Feb. 23, 2012

(65) Prior Publication Data
US 2013/0113201 A1 May 9, 2013

(30) Foreign Application Priority Data

Jul. 22, 2010 (DE) .......... 10 2010 031 923

(51) Int. Cl.
*B32B 38/06* (2006.01)
*B32B 7/12* (2006.01)
(Continued)

(52) U.S. Cl.
CPC ................ *B32B 38/06* (2013.01); *B32B 3/30* (2013.01); *B32B 7/12* (2013.01); *B32B 27/08* (2013.01);
(Continued)

(58) Field of Classification Search
CPC ...... B42D 15/00; B42D 15/10; B42D 25/355; B42D 25/328; B42D 25/455;
(Continued)

(56) References Cited

U.S. PATENT DOCUMENTS 3,719,523 A * 3/1973 Johnson .................... C08F 8/00
428/147
4,371,196 A 2/1983 von Kempski et al.
(Continued)

FOREIGN PATENT DOCUMENTS

CN 1118587 A 3/1996
CN 1404444 A 3/2003
(Continued)

OTHER PUBLICATIONS

International Search Report in PCT/EP2011/003648, dated Nov. 15, 2011 (2 pages).

*Primary Examiner* — Justin V Lewis
(74) *Attorney, Agent, or Firm* — Workman Nydegger

(57) ABSTRACT

Into a plastic card (1) of polycarbonate layers (10; 11; 12) there is laminated a security thread (3) by applying pressure and temperature, the security thread itself having a carrier foil (5) of polycarbonate and a coating (6) that is borne by the carrier foil and conveys holographic information. The connection of the polycarbonate carrier foil (5) of the security thread with the polycarbonate layer (10; 11; 12) of the data carrier adjoining said carrier foil takes place without using an adhesive or primer.

22 Claims, 3 Drawing Sheets

(51) Int. Cl.
  *B32B 3/30*      (2006.01)
  *B32B 27/32*     (2006.01)
  *B32B 27/30*     (2006.01)
  *B32B 27/36*     (2006.01)
  *B42D 25/328*    (2014.01)
  *B42D 25/355*    (2014.01)
  *B42D 25/455*    (2014.01)
  *B32B 27/08*     (2006.01)
  *B32B 37/14*     (2006.01)

(52) U.S. Cl.
  CPC .......... *B32B 27/30* (2013.01); *B32B 27/304* (2013.01); *B32B 27/32* (2013.01); *B32B 27/36* (2013.01); *B32B 27/365* (2013.01); *B32B 37/14* (2013.01); *B42D 25/328* (2014.10); *B42D 25/355* (2014.10); *B42D 25/455* (2014.10); *B32B 2255/10* (2013.01); *B32B 2255/205* (2013.01); *B32B 2307/41* (2013.01); *B32B 2307/412* (2013.01); *B32B 2307/418* (2013.01); *B32B 2307/51* (2013.01); *B32B 2307/538* (2013.01); *B32B 2307/732* (2013.01); *B32B 2307/75* (2013.01); *Y10T 156/1039* (2015.01)

(58) Field of Classification Search
  CPC ...... B42D 2033/30; G09C 1/00; B32B 38/06; B32B 37/14; B32B 27/36; B32B 27/30; B32B 27/08; Y10T 156/1039
  USPC .... 283/67, 70, 72, 74, 94, 95, 98, 101, 109, 283/110, 901; 428/156, 161, 164, 195.1, 428/208, 209
  See application file for complete search history.

(56) References Cited

U.S. PATENT DOCUMENTS

| | | | |
|---|---|---|---|
| 4,856,857 A | 8/1989 | Takeuchi et al. | |
| 4,971,646 A * | 11/1990 | Schell | B32B 37/1207 156/244.17 |
| 5,820,971 A | 10/1998 | Kaule et al. | |
| 6,294,241 B1 * | 9/2001 | Kaule | B32B 38/04 283/86 |
| 6,749,925 B2 * | 6/2004 | Hoppe | B29C 41/20 283/72 |
| 6,758,936 B1 * | 7/2004 | Kiekhaefer | B42D 25/00 156/250 |
| 7,637,537 B2 * | 12/2009 | Keller | B42D 25/00 283/109 |
| 2002/0122996 A1 * | 9/2002 | Cunningham Thomson et al. | B32B 27/08 430/14 |
| 2003/0127847 A1 | 7/2003 | Keiler et al. | |
| 2005/0035590 A1 * | 2/2005 | Jones | B42D 25/00 283/74 |
| 2008/0106002 A1 * | 5/2008 | Feldman | B32B 27/08 264/400 |
| 2008/0136161 A1 * | 6/2008 | Leenders | B41M 5/0029 283/94 |
| 2009/0115185 A1 * | 5/2009 | Hoffmuller | B42D 25/29 283/85 |
| 2009/0251749 A1 | 10/2009 | O'Boyle et al. | |
| 2010/0045027 A1 * | 2/2010 | Whiteman | B44F 1/10 283/107 |
| 2011/0027808 A1 | 2/2011 | Van Dongen | |
| 2013/0082458 A1 | 4/2013 | O'Boyle et al. | |

FOREIGN PATENT DOCUMENTS

| | | |
|---|---|---|
| CN | 101556752 A | 10/2009 |
| DE | 21 40 471 | 2/1972 |
| DE | 36 50 027 T2 | 11/1986 |
| DE | 100 13 410 A1 | 9/2001 |
| DE | 103 50 212 A1 | 5/2005 |
| EP | 0 037 507 B1 | 1/1984 |
| GB | 1 357 754 | 6/1974 |
| GB | 1 400 998 | 7/1975 |
| WO | 2008/060918 A1 | 5/2008 |

\* cited by examiner

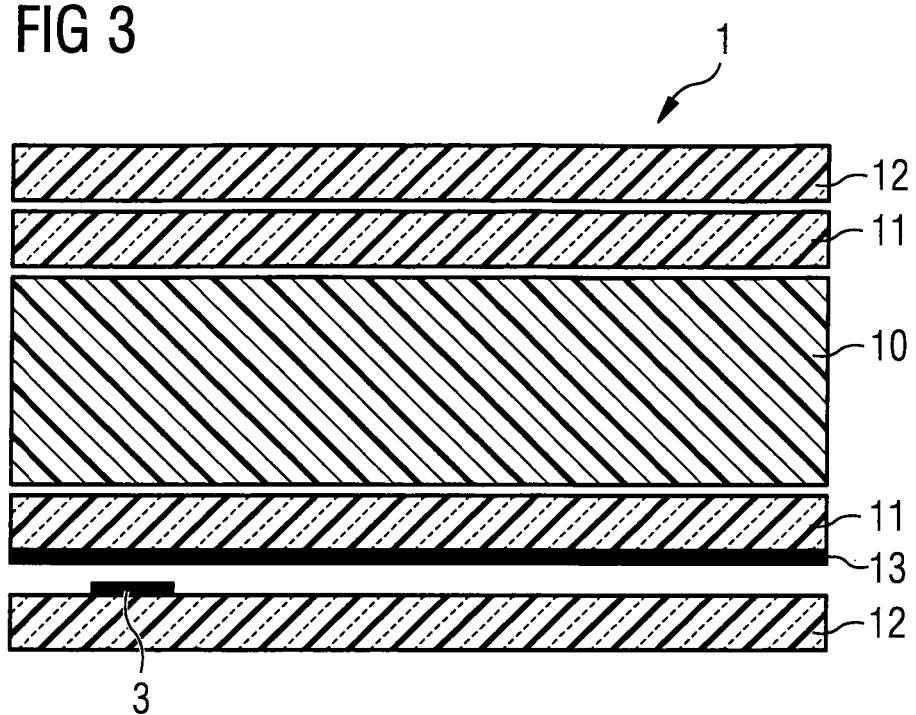
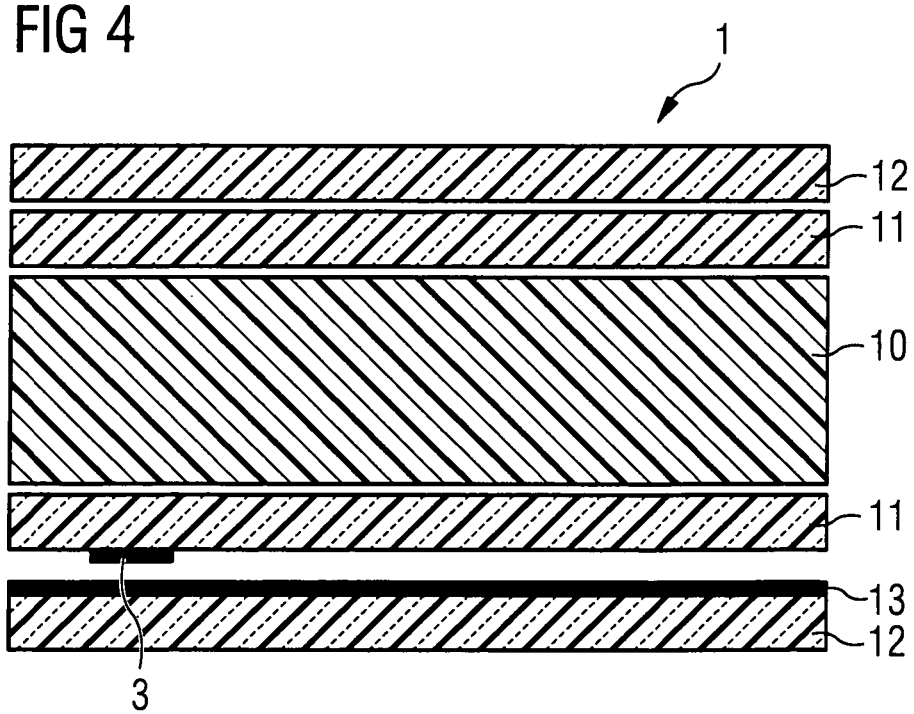

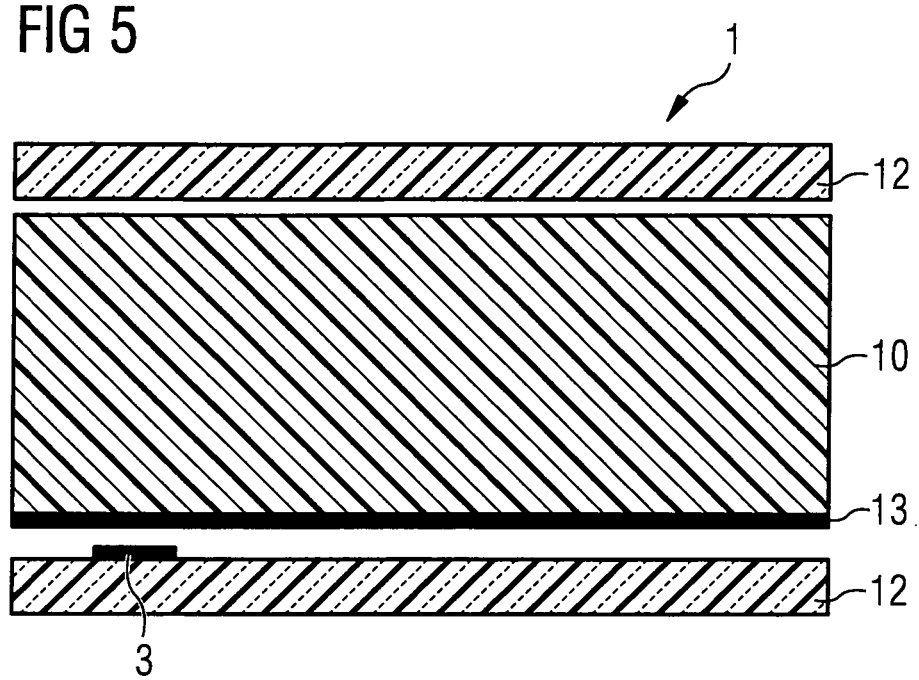
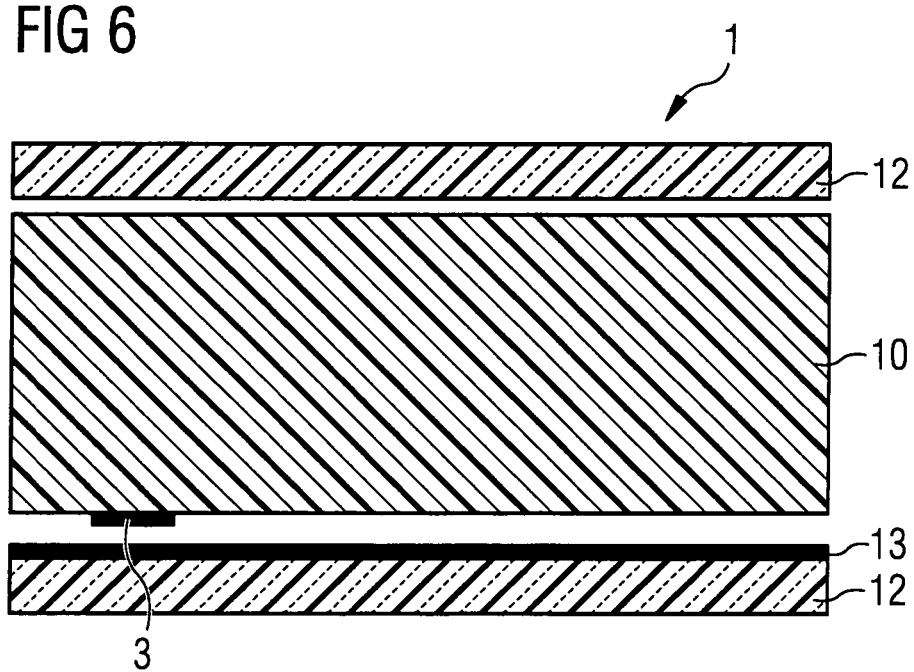

SECURITY THREAD FOR DATA CARRIERS, DATA CARRIERS, AND PRODUCTION OF SAID DATA CARRIERS

BACKGROUND OF THE INVENTION

A. Field of the Invention

The invention relates to a multilayer security thread that is integrated in a card-shaped data carrier, as well as a multilayer, in particular card-shaped data carrier with the security thread integrated therein and a method for producing the data carrier and the security thread.

B. Related Art

It is known to incorporate security threads in value documents, for example in banknotes, for protection against forgery. It is further known to incorporate such security threads also in multilayer plastic cards, such as for example credit cards, debit cards, bank cards, passports, driving licenses, employee identification cards, identity cards, admission tickets, membership cards and the like. It has turned out to be problematic that the security threads can form a predetermined breaking point within the card structure. This risk is given in particular when threads of a width of over 1 mm are employed, since upon subjecting the card to stress during use—for example by bending—the thread is separated from the adjoining card layers. Moreover, the risk is given that the security thread is detached from the composite and re-employed without authorization.

EP 0 037 507 B1 describes an identity card with a security thread inseparably integrated therein. The security thread is fixed in the card and the card layers are connected with each other preferably over the full area by bonding or welding, so that the security thread is connected inseparably with these and embedded in this. Moreover, the material properties are chosen such that a detachment attempt leads to a destruction of the security thread. In particular the material thickness of the security thread is chosen to be very thin with a thickness of 0.02 to 0.05 mm, and the material properties are adjusted to be very brittle. The security thread can consist of metal, a metal alloy, of glass or of plastic. It is further proposed to give the security thread further features. The additional security features can for example be the special type of metal or of the metal alloy, radioactivity, magnetism or fluorescence, a certain Ohmic resistance per length unit as well as an anodization of the thread in different colors.

WO 2008/060918 A1 proposes to firmly integrate a security thread that is configured as a so-called color shift foil in the layered composite of a two-layered plastic card. A color shift foil consists of several hundred thin layers of biaxially stretched plastic. To ensure a firm bond between the security thread and the layers of the card adjoining it, the security thread has a multiplicity of openings of any desired shape. When the card layers are subsequently softened and bonded with each other by applying pressure and temperature, there results, due to the openings, a mechanical anchoring of the security thread in the layer structure. Additionally the security thread is coated with a primer or an adhesive, so as to increase the adhesion between the security thread and the adjoining thermoplastic surfaces. It is further proposed to apply additional security elements, such as for example a hologram, to one of the card layers.

The above-described problem of reliably connecting a security thread is present in a similar fashion also in such security threads which have a coating that conveys a holographic information item.

Such security threads are for example known in connection with banknotes, but can also be integrated entirely in a plastic card structure as a so-called "lamination thread", i.e. including the PET carrier foil on which the coating is disposed that conveys the holographic information. Alternatively, merely the coating conveying the holographic information can be transferred and the carrier foil can be disposed of. In the latter case the term "transfer thread" is used. Since in the structure of the transfer thread there is provided a release layer between the coating conveying the holographic information and the carrier foil, to be able to simply strip the carrier foil after the application process, it is difficult to achieve a firm bond between the coating conveying the holographic information and a card layer adjoining it when such a transfer thread is to be integrated in a multilayer card structure. But also the integration of a lamination thread, i.e. including the carrier foil, in a card layer structure leads to the problems mentioned at the outset, in particular when the card layers are polycarbonate layers.

The solutions specified in EP 0 037 507 B1 and WO 2008/060918 A1 for reliably embedding a security thread in the card layer structure, in particular of a lamination thread with carrier foil and a coating conveying a holographic information item, are relatively elaborate.

It is the object of the present invention to propose a security thread bearing a coating that conveys a holographic information item and that can be reliably integrated in the layered composite of a multilayer data carrier in a simple fashion. In particular this relates to the incorporation of such a security thread in a card-shaped data carrier having polycarbonate layers or even consisting exclusively of polycarbonate layers.

SUMMARY OF THE DISCLOSURE

Correspondingly it is proposed for this purpose to configure the surface of the security thread with which the security thread adjoins a polycarbonate layer of the data carrier itself as a polycarbonate layer. Put differently, the multilayer security thread according to the invention comprises a first surface and a second surface. On the first surface there is disposed the coating conveying the holographic information, while the second surface is formed by the polycarbonate layer. For this purpose the carrier foil can be configured either completely as a single polycarbonate layer, or it can be configured to have several layers, wherein the exterior layer is a polycarbonate layer.

When such a security thread is laminated between the polycarbonate layers of e.g. a plastic card by applying pressure and temperature, a further adhesive can be omitted on the carrier side of the security thread, since the polycarbonate layer of the security thread's carrier foil directly bonds with the card layer of polycarbonate adjoining it, be it a transparent cover layer or a carrier layer or core foil of the card. The reliable bond between the security thread and the card layer in question can thus be achieved on the basis of the comparable material properties by applying pressure and temperature alone. The bond between the two layers is "direct" in the sense that an interposed adhesive and/or primer is omitted. The bond is instead based on a "fusion" of the layers with each other through hot lamination due to chemical and physical effects.

Instead of polycarbonate as carrier foil of the security thread, for the carrier foil also other materials can be employed which can be processed to form a layered composite with polycarbonate layers through hot lamination, such as PETG (polyethylene terephthalate glycol copolymer) or PVC (polyvinyl chloride). Fundamentally the materials to be connected with each other should be polar on the one hand, which is given in PC and for example PVC, and on the other hand their glass transition temperatures should not be too far apart. Alternatively for the material of the carrier foil of the security thread and for the materials of the layers to be connected therewith also different thermoplastic plastics can be employed, provided that they can be connected with each other, e.g. by the above-mentioned method of hot lamination. Due to the different glass transition temperatures for example a security thread with PCV as carrier foil can be laminated in a PC layer structure with a good bond strength.

The thickness of the carrier foil is preferably chosen to be small and lies in a range of 20 μm to 50 μm, particularly preferably in the range of 25 μm to 35 μm. Thereby the likelihood is increased that a thread is destroyed upon detachment from the layered composite.

To firmly fix the security thread in the layered composite not only to its carrier foil, but also to the coating conveying the holographic information, the coating conveying the holographic information has on its outer side a heat-sealable layer, which forms a firm bond with the card layer adjoining it during the hot lamination process. In the case of a card of polycarbonate layers, in which the security thread thus adjoins polycarbonate layers of the layered compound on both sides, the heat-sealable layer is preferably produced on the basis of a hydroxy-modified vinyl copolymer. This means that the hydroxy-modified vinyl copolymer forms the main constituent or substantial component of the layer material, and moreover usual additives, solvents and the like can be present. The application thickness of the heat seal lacquer can lie between 0.5 and 5 μm and preferably lies between 1 μm and 3 μm.

The coating conveying the holographic information is carried out on the carrier foil preferably as an embossed hologram. For this purpose the foil is printed over the full area with an embossing lacquer, into which there is subsequently embossed a diffractive structure or also an achromatically active structure Both structures act as optical grating. Insofar as these gratings have a diffractive effect according to the principles of light refraction, these are referred to as holograms. Upon viewing in daylight color phenomena occur. However when, due to the gratings, there merely occur angle-dependent reflections over the complete visible spectrum, for example in the case of so-called saw tooth gratings, these are referred to as achromatic structures. These result in areal light-matt effects. Within the meaning of the present invention the term "holographic information" covers both diffractive grating structures and achromatically active grating structures.

The thermoplastic embossing lacquers known from the hologram embossing of transfer foils and hologram threads can be employed as embossing lacquer. However, due to the later thermal stress upon laminating the security thread into the layered composite, a radiation-curing embossing lacquer system is preferred, for example a UV-radiation or electron-beam curing lacquer system. These are such lacquer systems which contain radiation-crosslinking polymers in the lacquer. In this case radically curing acrylate lacquers are used particularly preferably, but also cationically curing embossing lacquers can be used.

Lacquers with low viscosity are particularly suitable. The viscosity of the lacquers at room temperature should lie in a range from 10 DIN-sec to 30 DIN-sec (measured using a Ford 4 mm cup), preferably in the range from 15 DIN-sec to 25 DIN-sec. Thereby the lacquers can be processed without the necessity of heat supply, so that also the above-mentioned thin polycarbonate foils can be processed with sufficient production reliability.

To the radiation-curable lacquers there are preferably added liquid photoinitiators. Photoinitiators start the cross-linking process more efficiently, since they have a considerably greater effective cross-section than the actual UV-crosslinking polymers in the lacquer. The curing is thus made possible upon brief, intensive irradiation. Besides the usual absorption spectrum in the UV wavelength range, the photoinitiators preferably also have specific absorption lines in the visible range. This is important when, during the embossing process, curing takes place through the carrier foil and the former absorbs strongly in the wavelength range of the UV radiation, but in contrast is transmissive in the visible range. By employing doped UV emitters, for example Fe- or Ga- or Pb doping, in this combination there can be achieved a particularly stable anchorage of a UV-curing lacquer on polycarbonate foils. In Fe-doped emitters one obtains for example besides the broadband UV emission range, a strong emission in the visible range from 400 to around 450 nm, with intensive emission lines for example at approximately 436 nm. When photoinitiators are employed which absorb strongly in this wavelength range, the curing of the lacquer takes place very quickly.

To achieve the desired visibility of the diffractive or achromatically active embossed structure, preferably a reflection layer is applied to the embossing lacquer layer. Without such a reflection layer the holographic information is only weakly visually recognizable. Metallic reflection layers for example of aluminum, copper or chromium, but also of iron, silver or gold or gold-tone alloys are particularly suitable, which are vapor-deposited preferably directly on the embossed surface in layer thicknesses of 15 nm to 50 nm. Instead of a metallic reflection layer also a coating with highly refractive properties for example of $TiO_2$ or ZnS can be used. Alternatively the reflection layer can be achieved by an overprinting with an ink containing metal pigments, when the metal pigments in this ink float up to the embossed structure. However, the above-mentioned metal layers are optically superior to such inks containing metal pigments.

Advantageously the reflection layer can be removed completely in some regions, in order to produce a so-called negative writing, also called "clear text", which, depending on the background, is strongly or less strongly visible or also visible only upon viewing in transmitted light. Such openings of the reflection layer can be produced in the known fashion through etching methods or washing methods. In the etching method the relevant regions of the reflection layer are subsequently removed in the etching bath, whereas in the washing method the relevant regions are printed with a washing ink before the application of the reflection layer, wherein the washing ink is subsequently washed out with the reflection layer lying above it. An additional optical information item can be integrated into the thread by applying one or several glazing ink layers to the metallic reflection layer over the full area or partially. Thereby it is possible for example to optically deposit a colored base coat for the optically visibly deposited hologram.

Before the application of the already mentioned heat-sealable lacquer layer, the reflection layer is preferably equipped with a primer coating in order to protect it from environmental and chemical influences. This primer coating can be constructed of one or several layers. As primer for example isocyanate-crosslinking polyurethanes are suitable. The layer thicknesses for the primer layers are in range between 0.3 µm to 5 µm and preferably lie in the range of 0.7 µm to 3 µm.

The above-described principle, underlying the invention, of employing a laminatable security thread with a coating conveying a holographic information item, said security thread achieving a good bond between the material of the thread's carrier foil and the material of the adjoining card layer, can be transferred from the hitherto described polycarbonate data carrier layers to other layer materials as well. For example in a card structure consisting of polyvinyl chloride (PVC) layers, PVC could be employed likewise as material for the carrier foil of the security thread. In a card structure of PETG card layers (PETG=polyethylene terephthalate glycol copolymer) in contrast, the material of the carrier foil of the security thread would preferably consist of PETG. The principle of the invention can thus be transferred to such material combinations which can form a firm bond with each other through hot lamination without using an adhesive or primer. A corresponding multilayer data carrier is then characterized in that the carrier foil or at least the exterior layer of the carrier foil of the security thread bearing the coating conveying the holographic information is directly connected with the adjoining layer of the data carrier. Particularly preferably these two layers to be connected with each other are produced on the basis of the same thermoplastic plastic.

To produce such a multilayer, in particular card-shaped data carrier, correspondingly a carrier layer of the data carrier and a transparent cover layer of the data carrier are joined with the security thread such that the carrier foil of the security thread directly—i.e. without an adhesive or primer—adjoins the transparent cover layer or preferably the carrier layer with its free surface (this is the surface lying opposite the coating conveying the holographic information). This layer structure is subsequently laminated together by applying pressure and temperature such that the security thread's carrier foil forms a bond with the card layer adjoining it.

DESCRIPTION OF THE DRAWINGS

Preferred embodiments of the invention will hereinafter be explained with reference to the enclosed drawings. The figures are described as follows.

DETAILED DESCRIPTION

Figure 1:
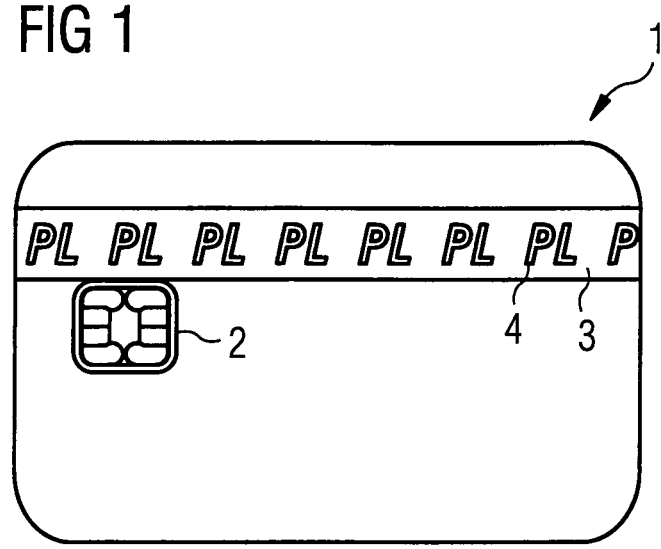
FIG. 1 a plastic card with security thread in a plan view.

FIG. 1 shows a multilayer card-shaped data carrier 1 which is configured here as a contact chip module 2, in plan view. A security thread 3 lying under a transparent cover layer is laminated into the layered composite of the multilayer data carrier and reaches from one chip-card edge to the opposite chip-card edge. The security thread 3 has visually recognizable markings 4, which are realized through a partial demetalization of a metallic coating of the security thread 3. Alternatively the demetalization can also be omitted.

Figure 2:
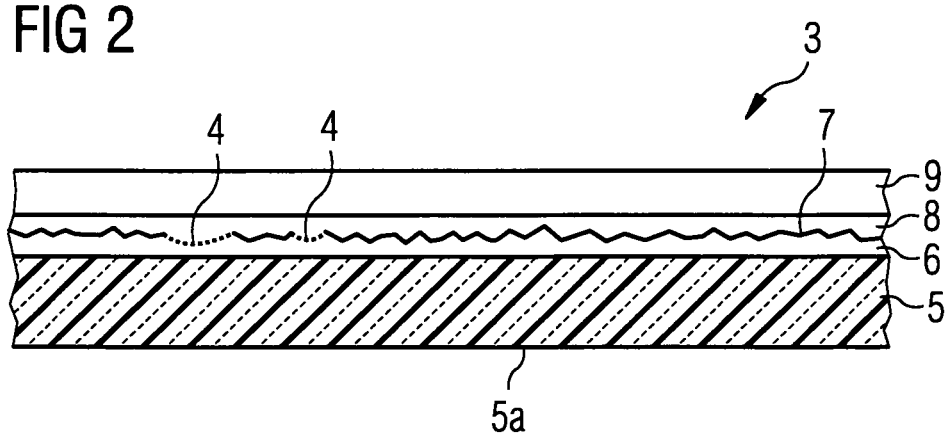
FIG. 2 the security thread of the plastic card of FIG. 1 schematically in cross section, FIG. 3 a layer structure of the plastic card of FIG. 1 according to a first exemplary embodiment, FIG. 4 a layer structure of the plastic card of FIG. 1 according to a second exemplary embodiment, FIG. 5 a layer structure of the plastic card of FIG. 1 according to a third exemplary embodiment and FIG. 6 a layer structure of the plastic card of FIG. 1 according to a fourth exemplary embodiment.

The security thread 3 of the chip card according to FIG. 1 is shown schematically in cross section in FIG. 2. The respective dimensions of the layer thicknesses are not true to scale relative to each other. Correspondingly the security thread 3 has a carrier foil 5, which is configured as a single layer here and which is a polycarbonate layer. To the polycarbonate layer the usual additives can be admixed, such as for example fillers, dyes and the like. The carrier foil can have a thickness of 30 µm for this exemplary embodiment.

Instead of a single-layer configuration, the carrier foil 5 can also be of a multilayer configuration, wherein at least the exterior surface 5a of the carrier foil 5 is then formed by a polycarbonate layer. This is important to produce a firm bond of the carrier foil 5 with a polycarbonate layer of the data carrier 1 adjoining it. An example for a multilayer foil is a polycarbonate foil with chemical surface-treatment layer that supports the adhesion of the lacquer 6. Corresponding surface coatings come from the substance class of acrylates or other suitable adhesion promoters. They are either applied to the polycarbonate foil directly upon the production of the foil or subsequently in an extra printing mechanism or analogous application method. The thickness of such layers amounts to 0.1 µm to 5 µm. These layers can also serve to reduce the surface roughness of the polycarbonate foil to obtain brilliant optics upon applying the lacquer 6.

To the side of the carrier foil 5 lying opposite the surface 5a there is applied lacquer 6 curable by means of UV radiation, which contains liquid photoinitiators and has a viscosity of around 20 DIN-sec before the embossing and curing process. In this lacquer layer 6 a hologram structure was embossed before the lacquer was cured. The thickness of the lacquer layer 6 amounts to approximately 3 µm on average.

The embossed surface of the lacquer layer 6 is vapor-coated with a metallic reflection layer 7, for example aluminum, chromium or copper, wherein in the regions 4 through the above-described washing method demetalized zones were created which convey further information items in addition to the holographic information that is conveyed through the diffractive embossed structure of the lacquer layer 6. Alternatively the demetalization can also be omitted. These further information items can represent visually recognizable patterns, characters, code or logos. The metallic layer can additionally be printed over the full area or partially with one or several glazing ink layers, to thus incorporate an additional optical information item.

The metallic reflection layer 7 which has for example a thickness of only 30 nm, is furnished with a primer coating 8 that consists of isocyanate-crosslinked polyurethane and in turn has for example a thickness of around 2 µm. Above everything there is applied a heat-sealable lacquer layer 9 of a hydroxy-modified vinyl copolymer with a thickness of for example again around 2 µm. This heat-sealable lacquer layer 9 has the function to produce a reliable and durable bond with a polycarbonate layer of the layered card composite adjoining said lacquer layer, when the complete layer structure is bonded to form a uniform layered composite by applying pressure and temperature.

FIGS. 3 to 6 show different variants of card layer structures with security thread 3 integrated therein, wherein these variants are by no means finite.

In the FIGS. 3 and 4 the card layer structure consists of a total of five card layers, namely a card core foil 10 furnished on both sides with respectively two cover layers 11 and 12. The card core foil is normally opaque and also the interior cover layers 11 can be opaque. The exterior cover layers 12 in contrast are at least partially transparent, so as to be able to visually recognize from the outside a print 13 lying below as well as the security thread 3 likewise lying below the exterior cover layer 12. In FIG. 3 the print 13 is disposed on the interior cover layer 11, and the security thread 3 lies between the print 13 and the exterior cover layer 12. In FIG. 4 the print 13 is in contrast located on the inside of the exterior cover layer 12 and the security thread 3 between the cover layer 12 with the print 13 and the interior cover layer 11. In the exemplary embodiment according to FIG. 4 it must of course be ensured that the print layer 13 in the region of the security thread 3 is sufficiently transparent so as to leave the holographic information of the security thread 3 uncovered.

In all represented exemplary embodiments the security thread 3 is first applied by means of the heat seal lacquer 9 to the relevant cover layer 12 (FIG. 3) or 11 (FIG. 4). In the exemplary embodiment according to FIG. 3 correspondingly the primer layer 8 and the heat seal lacquer 9 are transparent, so that the embossed holographic information located below remains visible. In the exemplary embodiment according to FIG. 4 in contrast the carrier foil 5 and the embossed lacquer layer 6 are optically transparent so as to guarantee also in this exemplary embodiment that the embossed holographic information is visible through the exterior cover layer 12.

FIGS. 5 and 6 show corresponding exemplary embodiments with merely one exterior cover layer 12. The difference to the exemplary embodiments according to FIGS. 3 and 4 is only that the print 13 (FIG. 5) or the security thread 3 (FIG. 6) are applied directly to the core foil 10.

In all exemplary embodiments at least the cover layers 11 and 12 are polycarbonate layers and at least in the exemplary embodiments according to FIGS. 5 and 6 also the card core foil 10 consists of a polycarbonate layer. Insofar as the above-mentioned cover layers and card core foils are of a multilayer configuration themselves, at least their exterior surfaces are formed by polycarbonate layers.

The invention claimed is:

1. A multilayer security thread for a data carrier, the security thread comprising:
    a carrier foil having a first surface and a second surface, wherein
    a coating including a holographic information item is formed on the first surface, and
    the second surface includes a thermoplastic layer configured to be bonded in direct contact with an adjoining layer of the data carrier by hot lamination, the adjoining layer of the data carrier being a polycarbonate layer, a polyethylene terephthalate glycol copolymer (PETG) layer, or a polyvinyl chloride (PVC) layer, wherein
    the thermoplastic layer of the second surface comprises a polycarbonate layer, a polyethylene terephthalate glycol copolymer (PETG) layer, or a polyvinyl chloride (PVC) layer so as to have a same composition as the adjoining layer of the data carrier that includes the polycarbonate layer, polyethylene terephthalate glycol copolymer (PETG) layer, or polyvinyl chloride (PVC) layer of the data carrier,
    the thermoplastic layer is a non-adhesive layer,
    the thermoplastic layer is configured to be bonded in direct contact with the polycarbonate layer, polyethylene terephthalate glycol copolymer (PETG) layer, or polyvinyl chloride (PVC) layer of the data carrier without any adhesive or primer between the thermoplastic layer and the polycarbonate layer, and
    wherein a thickness of the carrier foil lies in a range of 20 μm to 50 μm.

2. The security thread according to claim 1, wherein a heat-sealable layer is formed on a surface of the coating conveying the holographic information opposite from the first surface of the carrier foil.

3. The security thread according to claim 2, wherein the heat-sealable layer includes a hydroxy-modified vinyl copolymer.

4. The security thread according to claim 1, wherein the coating conveying the holographic information is configured as an embossed hologram and comprises a plastic layer in which there is embossed a diffractive or achromatically active structure conveying the holographic information.

5. The security thread according to claim 4, wherein the embossed plastic layer comprises a radiation-curable lacquer system.

6. The security thread according to claim 4, wherein the embossed plastic layer comprises an acrylate lacquer cured by a radical mechanism or a cationically curing lacquer.

7. The security thread according to claim 4, wherein structure embossed in the plastic layer is at least partially coated with a reflection layer.

8. The security thread according to claim 7, wherein the reflection layer is removed completely in some regions of the structure embossed in the plastic layer.

9. The security thread according to claim 1, wherein the thermoplastic layer of the second surface comprises a polycarbonate layer.

10. The security thread according to claim 1, wherein the thermoplastic layer of the second surface comprises a polyethylene terephthalate glycol copolymer (PETG) layer.

11. The security thread according to claim 1, wherein the thermoplastic layer of the second surface comprises a polyvinyl chloride (PVC) layer.

12. The security thread according to claim 1, wherein the thickness of the carrier foil lies in a range of 25 μm to 35 μm.

13. The security thread according to claim 1, further comprising
    a heat-sealable layer is formed on a surface of the coating conveying the holographic information opposite from the first surface of the carrier foil, and
    a primer coating is provided between the heat-sealable layer and the coating conveying the holographic information, the primer coating including a cross-linked polyurethane.

14. A multilayer data carrier comprising:
    a carrier layer including a polycarbonate layer, a polyethylene terephthalate glycol copolymer (PETG) layer, or a polyvinyl chloride (PVC) layer;
    a transparent cover layer; and,
    a multilayer security thread adjoining the carrier layer and the transparent cover layer, wherein
    the security thread includes a carrier foil with a first surface and a second surface opposite the first surface,
    the security thread includes an optically variable coating including a holographic information item formed on the first surface,
    the second surface includes a thermoplastic layer, the thermoplastic layer of the second surface being a non-adhesive layer,
    the thermoplastic layer is bonded in direct contact with an adjoining layer of the data carrier by hot lamination, the adjoining layer of the data carrier being a polycarbonate layer, a polyethylene terephthalate glycol copolymer (PETG) layer, or a polyvinyl chloride (PVC) layer, the thermoplastic layer of the second surface comprises a polycarbonate layer, a polyethylene terephthalate glycol copolymer (PETG) layer, or a polyvinyl chloride (PVC) layer so as to have a same composition as the adjoining layer of the data carrier that includes the polycarbonate layer, polyethylene terephthalate glycol copolymer (PETG) layer, or polyvinyl chloride (PVC) layer of the data carrier, the thermoplastic layer of the second surface of the carrier foil is directly bonded to and in direct contact with the polycarbonate layer, polyethylene terephthalate glycol copolymer (PETG) layer, or polyvinyl chloride (PVC) layer of the carrier without any adhesive or primer between the thermoplastic layer and the polycarbonate, and wherein a thickness of the carrier foil lies in a range of 20 µm to 50 µm.

15. The data carrier according to claim 14, wherein the second surface of the carrier foil of the security thread and the layer of the data carrier adjoining said second surface comprises material layers which enable obtaining a firm bond with each other through hot lamination.

16. The data carrier according to claim 15, wherein the second surface of the carrier foil of the security thread comprises a layer of polycarbonate, polyethylene terephthalate, polyvinyl chloride or another plastic that can form a firm bond with PC through hot lamination, and in that the layer of the data carrier adjoining said second surface is a PC layer.

17. The data carrier according to claim 14, wherein both the carrier layer of the data carrier adjoining the security thread and the transparent cover layer of the data carrier adjoining the security thread are PC layers.

18. The data carrier according to claim 14, comprising the security thread recited in claim 1.

19. A method for producing a multilayer data carrier according to claim 14, comprising the steps of:
joining the transparent cover layer and the carrier layer with the multilayer security thread in such a fashion that the carrier foil of the security thread directly adjoins either of the two above-mentioned layers with its second surface, and
laminating the cover layer, carrier layer and the security thread with each other by applying pressure and temperature, such that the carrier foil of the security thread forms a bond with either of said two layers.

20. A method for producing a security thread according to claim 14, comprising the step of applying a layer of a radiation-curable lacquer, into which the holographic information was embossed or is embossed, to the first surface of the carrier foil configured as a polycarbonate layer, and the further step of irradiating the lacquer.

21. The method according to claim 20, wherein the step of irradiating is effected by means of a doped UV emitter.

22. The method according to claim 20, wherein the radiation-curable lacquer is applied with a viscosity in a range from 10 to 30 DIN-sec.

* * * * *